No. 786,584. PATENTED APR. 4, 1905.
I. S. MOORE & A. E. PACE.
INSECT DESTROYER.
APPLICATION FILED NOV. 1, 1904.

2 SHEETS—SHEET 2.

WITNESSES:
INVENTORS
Isham S. Moore
Azie E. Pace
BY
Milo B. Stevens and Co.
Attorneys No. 786,584. Patented April 4, 1905.

UNITED STATES PATENT OFFICE.

ISHAM S. MOORE AND AZIE E. PACE, OF CHARCO, TEXAS; SAID PACE ASSIGNOR TO SAID MOORE.

INSECT-DESTROYER.

SPECIFICATION forming part of Letters Patent No. 786,584, dated April 4, 1905.

Application filed November 1, 1904. Serial No. 230,952.

*To all whom it may concern:*

Be it known that we, ISHAM S. MOORE and AZIE E. PACE, citizens of the United States, residing at Charco, in the county of Goliad and State of Texas, have invented new and useful Improvements in Insect-Destroyers, of which the following is a specification.

Our invention relates to insect-destroyers, and more particularly one for destroying cotton-boll weevils.

The object of the invention is to provide a simple and effective device which can be readily attached to any cultivator and which will catch and destroy the insects without injury to the plants.

Improved details in the construction and arrangement of the various parts of the invention will be apparent from the following description.

Figure 1:
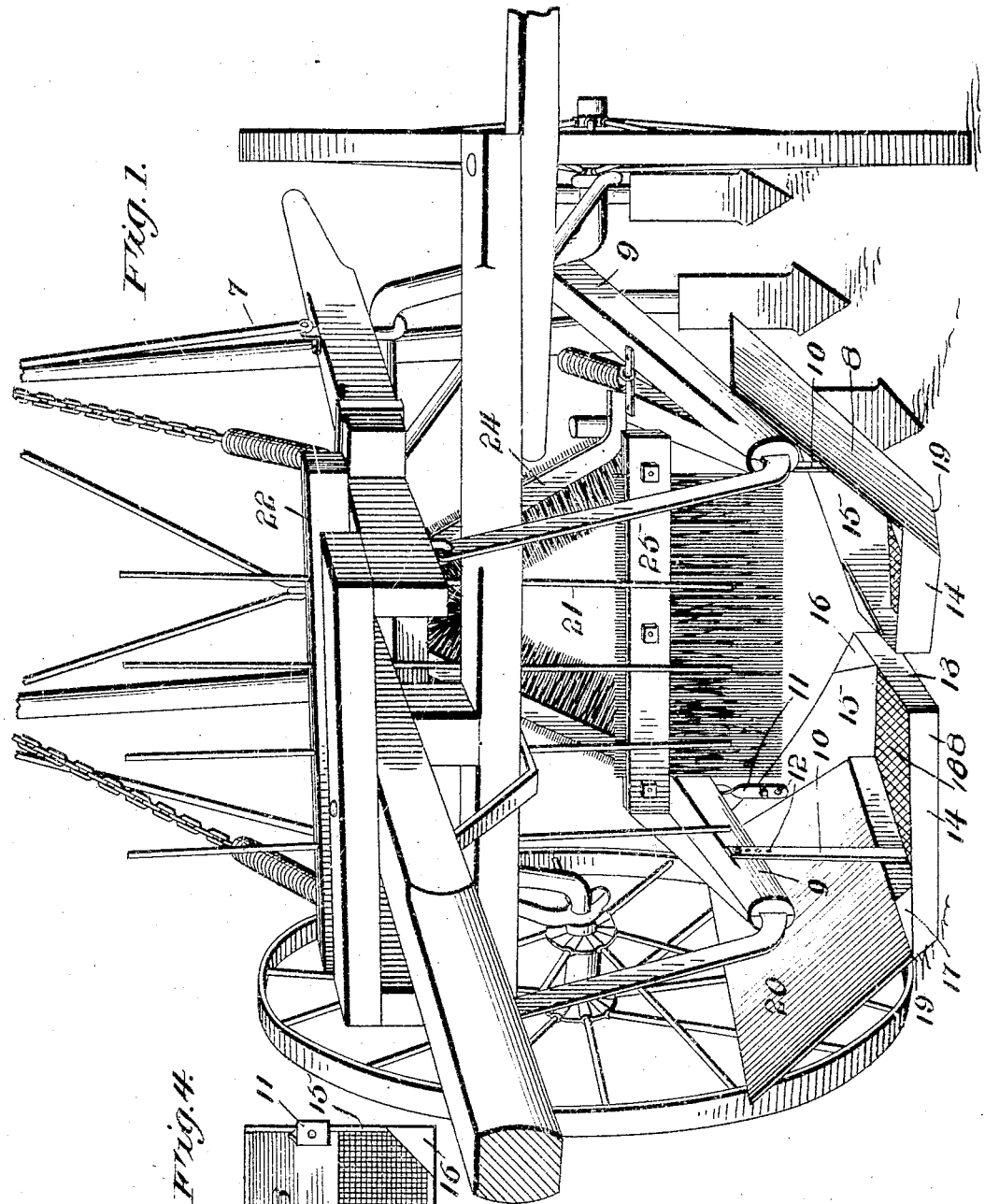
Figure 2:
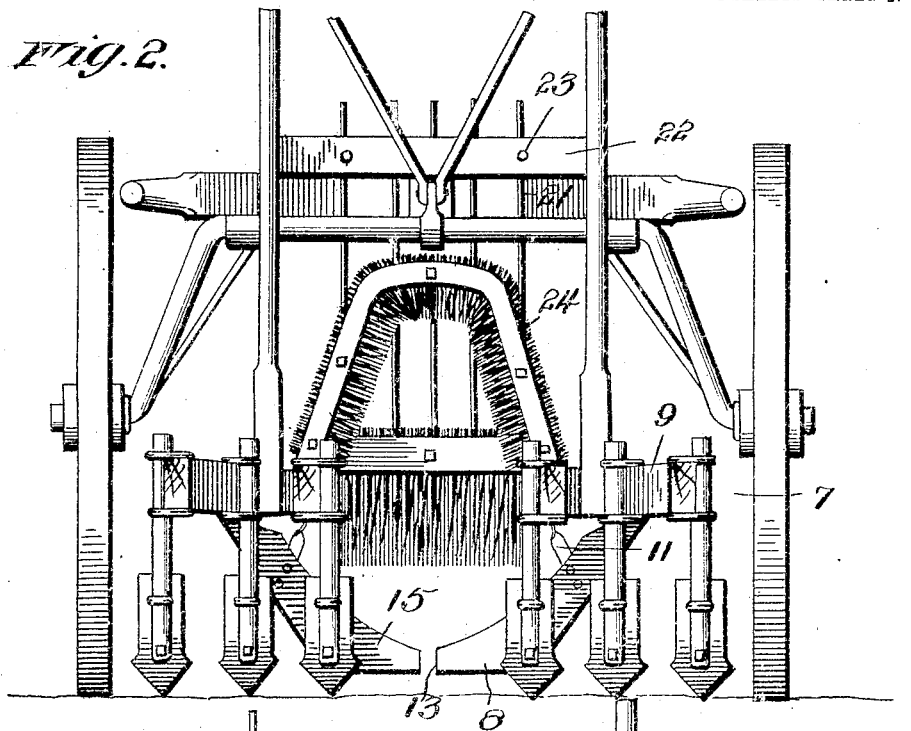
Figure 3:
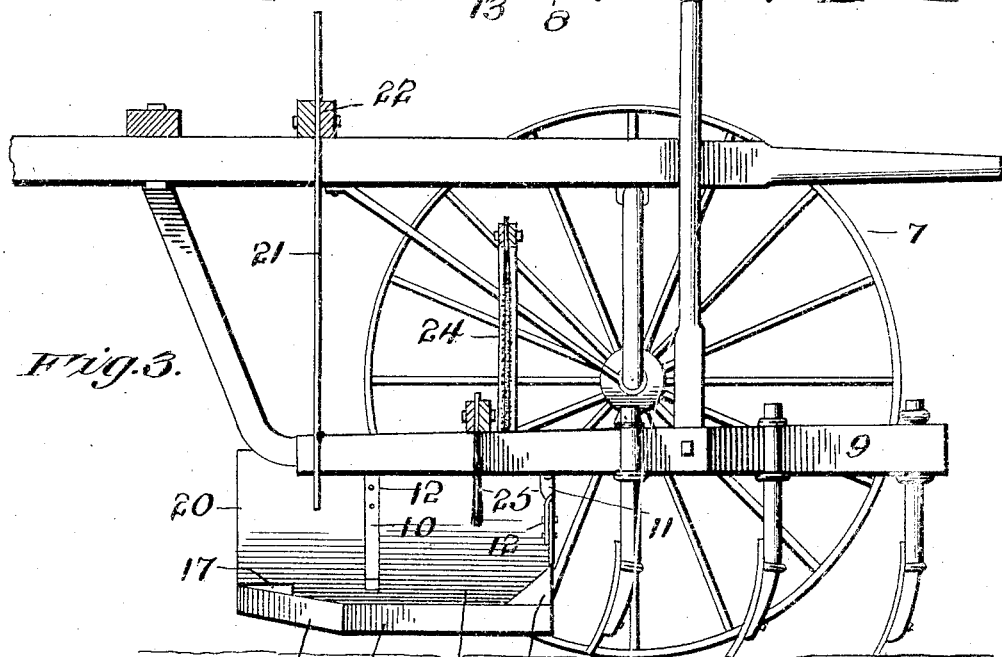

In the accompanying drawings, Figure 1 is a perspective view of the invention, showing the same applied to an ordinary cultivator. Fig. 2 is a rear end view. Fig. 3 is a central longitudinal section. Fig. 4 is a plan view of one of the pans.

Referring specifically to the drawings, 7 denotes a cultivator of ordinary construction, nothing being claimed with respect thereto.

At 8 are indicated pans, which are secured to the shovel-beams 9 by hangers 10, which are fastened to the sides of the pans and bolted to said beams. The pans are further secured by hangers 11, extending from the rear ends thereof, and also bolted to the beams 9. The hangers 10 and 11 are each provided with a number of bolt-holes 12 to permit vertical adjustment of the pans according to the height of the plants. The inner sides 13 of the pans are spaced from each other to permit the passage of the plants, and at the front end the sides are beveled, as at 14, to guide the plants between the pans. The rear ends 15 of the pans are made higher than the other sides, thereby preventing leaves, squares, and bolls from being dragged out of the pan and with them of course many of the weevils and other insects that have been caught. The rear corner nearest the plants is also covered, as at 16, to prevent a boll or a limb of the plant from being caught in said corner and torn off. The front ends of the pans are covered, as at 17, for a short distance, and at the rear ends the pans are deeper than in front, so that none of the oil will be spilled when the cultivator-shovels are raised out of the ground or in going over rough ground. The pans can be filled with kerosene or other oil to kill the insects as they drop thereinto. Wire screens 18 are placed in the pans a short distance above their bottoms to prevent bolls, leaves, and other objects from falling into the oil. From the outer sides 19 of the pans wings 20 extend upwardly and outwardly in a slanting direction, which wings convey and drop such insects into the pans as are not directly over them.

At 21 are indicated the agitators, which consists in a number of vertically-extending rods, as shown. These rods are clamped between two plates 22, which are fastened to the top of the cultivator-frame. The rods are directly over the pans and can be raised or lowered by simply loosening the bolts 23, by which the plates are drawn together, thus making them conform to the height and shape of the plants in the different stages of their growth and development. In addition to the agitators we also employ an arch-shaped brush 24, which is placed immediately behind the said agitators and directly over the center of the row of plants. The brush is fastened to the beams 9, and its object is to knock off the plants and into the pans any insects that may have escaped the agitators. Another brush, 25, extends between the beams 9 directly under the brush 24. This brush 25 is intended to be used for young or small plants, the brush 24 not being used until the cotton has attained sufficient growth to be reached thereby.

The operation of the destroyer will be apparent from the foregoing description. The cultivator is run along the rows of plants, as usual, and the insects are knocked off by the agitators or brushes into the pans.

The device can be readily attached to any cultivator without altering its construction in the least, and the operator can use the destroyer while the plants are being cultivated, the pans being guided with the cultivator-shovels, they being run as close to the plants as desired. The hangers 10 can be fastened to either the inside or outside of the beams 9, and in this manner, as well as by guiding the pans, as just stated, the distance of the pans from the plants is regulated. The pans also being vertically adjustable, they can be run near the ground when the plants are young. When the plants get older and have a crop of bolls on the lower part of the stalks, the pans can be raised above these and continue to catch the weevils from the upper portions of the stalks without breaking off or injuring the bolls already on the plants.

Having thus described our invention, what is claimed as new, and desired to be secured by Letters Patent, is—

1. In an insect-destroyer, a shallow pan having a relatively high rear end; a wing extending upwardly and outwardly from one of the sides of the pan, and a strip covering one of the rear corners of the pan.

2. In an insect-destroyer, the combination with a supporting-frame; of pans suspended therefrom and spaced apart to permit passage of the plants therebetween; wings extending upwardly and outwardly from the outer sides of the pans to collect the insects and drop them into the pans; and strips covering the rear inner corners of the pans.

3. In an insect-destroyer, the combination with a supporting-frame; of pans suspended therefrom and spaced apart to permit passage of the plants therebetween; wings extending upwardly and outwardly from the outer sides of the pans to collect the insects and drop them into the pans; strips covering the rear inner corners of the pans; and agitators and brushes above the pans.

4. In an insect-destroyer, the combination with a supporting-frame; pans carried thereby and spaced apart to permit passage of the plants therebetween; wings extending upwardly and outwardly from the outer sides of the pans to convey the insects into the pans; agitator-rods over the pans; and a brush behind the rods.

5. In an insect-destroyer, the combination with a supporting-frame; pans carried thereby and spaced apart to permit passage of the plants therebetween; wings extending upwardly and outwardly from the outer sides of the pans to convey the insects thereinto; vertically-adjustable agitator-rods over the pans; and an arched brush behind the rods.

In testimony whereof we have signed our names to this specification in the presence of two subscribing witnesses.

ISHAM S. MOORE.
AZIE E. PACE.

Witnesses:
   JOHN H. CHAMBERS,
   A. COUTRET.